United States Patent [19]

Swanson

[11] 4,212,577

[45] Jul. 15, 1980

[54] GRAPPLE

[76] Inventor: Ronald V. Swanson, 410 Elm St., Port Moody, British Columbia, Canada, V3H 2Z4

[21] Appl. No.: 862,865

[22] Filed: Dec. 21, 1977

[30] Foreign Application Priority Data

Jun. 25, 1977 [GB] United Kingdom ............... 26735/77

[51] Int. Cl.[2] ............................................. B65G 47/90

[52] U.S. Cl. ..................................... 414/23; 81/57.17; 294/21; 294/88; 414/731; 414/732; 414/739; 414/757

[58] Field of Search ...................... 214/3, 3.1, 2.5, 1 P, 214/1 BD, 147 T, 147 R, 147 G, 1 QC, 1 CM; 294/88, 106, 86 LS, 21, 86 CG; 81/57.17; 414/22, 23, 24, 743, 745, 729, 757, 731, 732, 734, 739

[56] References Cited

U.S. PATENT DOCUMENTS

| | | | |
|---|---|---|---|
| 1,752,737 | 4/1930 | Grinnell | 294/21 |
| 2,746,329 | 5/1956 | Paget | 81/57.17 |
| 3,112,830 | 12/1963 | Podlesak | 214/3 |
| 3,177,944 | 4/1965 | Knights | 214/2.5 X |
| 3,776,584 | 12/1973 | Van Gerven | 294/21 |

*Primary Examiner*—Frank E. Werner
*Attorney, Agent, or Firm*—Carver and Company

[57] ABSTRACT

A grapple attachment for the boom of a hoisting machine having a pair of arms movable between open and closed positions, the arms supporting an endless chain which, when the arms are closed, embrace a pole to be placed so that the pole can be lifted and then rotated about its own axis by a drive motor engaging the chain so that the fittings and the like attached to the pole can be aligned in a selected direction while the pole is held by the grapple.

4 Claims, 6 Drawing Figures

GRAPPLE

BACKGROUND OF THE INVENTION

1. Field of the Invention

This invention relates to grapples, and in particular to grapples used with power equipment for handling poles, such as electric power poles and telephone poles.

2. Prior Art

The term "pole" herein refers to any elongated, generally vertically disposed column, having a generally circular cross-section. Erection of poles, such as telephone poles and electric power poles usually requires, by reason of the fact that the poles have been notched and bored before they are installed, that the poles be set in a vertical position, but also be oriented so that cross arms and the like face in the proper direction.

In procedures heretofore developed for setting poles, the pole is usually suspended from an articulated boom of a hoisting machine by a rope, or the like, which is secured to the pole above its center of gravity. The pole when hoisted depends substantially vertically, and then with the assistance of a number of men at the butt end, the pole is jockeyed into position and lowered onto a support base or into a prepared hole with the butt end slightly clear of the bottom. The pole is rotated about its axis so that it is correctly oriented in azimuth and then lowered fully into the hole. The pole must then be placed in and held in an upright position while the hole is filled and tamped.

These operations require the use of a considerable number of men to control swinging movements and to position the pole while it is lifted and suspended, and to hold the pole upright during filling and tamping operations. Furthermore where long and heavy poles are being set, the operation can be quite hazardous due to the fact that the pole is hung freely from the machine boom and thus swinging movements cannot be fully controlled by the machine operator.

SUMMARY OF THE INVENTION

The present invention provides a grapple which is adapted to be attached to a boom of a lifting machine, which is so constructed that a pole can be firmly grasped by the grapple, lifted to an upright position and set in an upright position above the support base or with the butt end within a prepared hole, and which enables the machine operator, without moving the position of his machine, to rotate the boom about its own longitudinal axis so as to enable fittings, and the like, which are to be attached to the pole to be correctly oriented in azimuth.

The grapple of the present invention comprises a pair of swingably mounted arms operable between open and closed positions, an endless chain mounted for running movement between the arms and having a pole confronting run extending between outer tips of the arms so as to form a gripping loop around a pole to be lifted when the arms are closed, and means for driving the chain so as to enable the pole, while gripped by the chain, to be rotated about its longitudinal axis.

A detailed description following, related to the drawings, gives exemplification of apparatus according to the invention which, however, is capable of expression in means other than those particularly described and illustrated.

DETAILED DESCRIPTION

Figure 1:
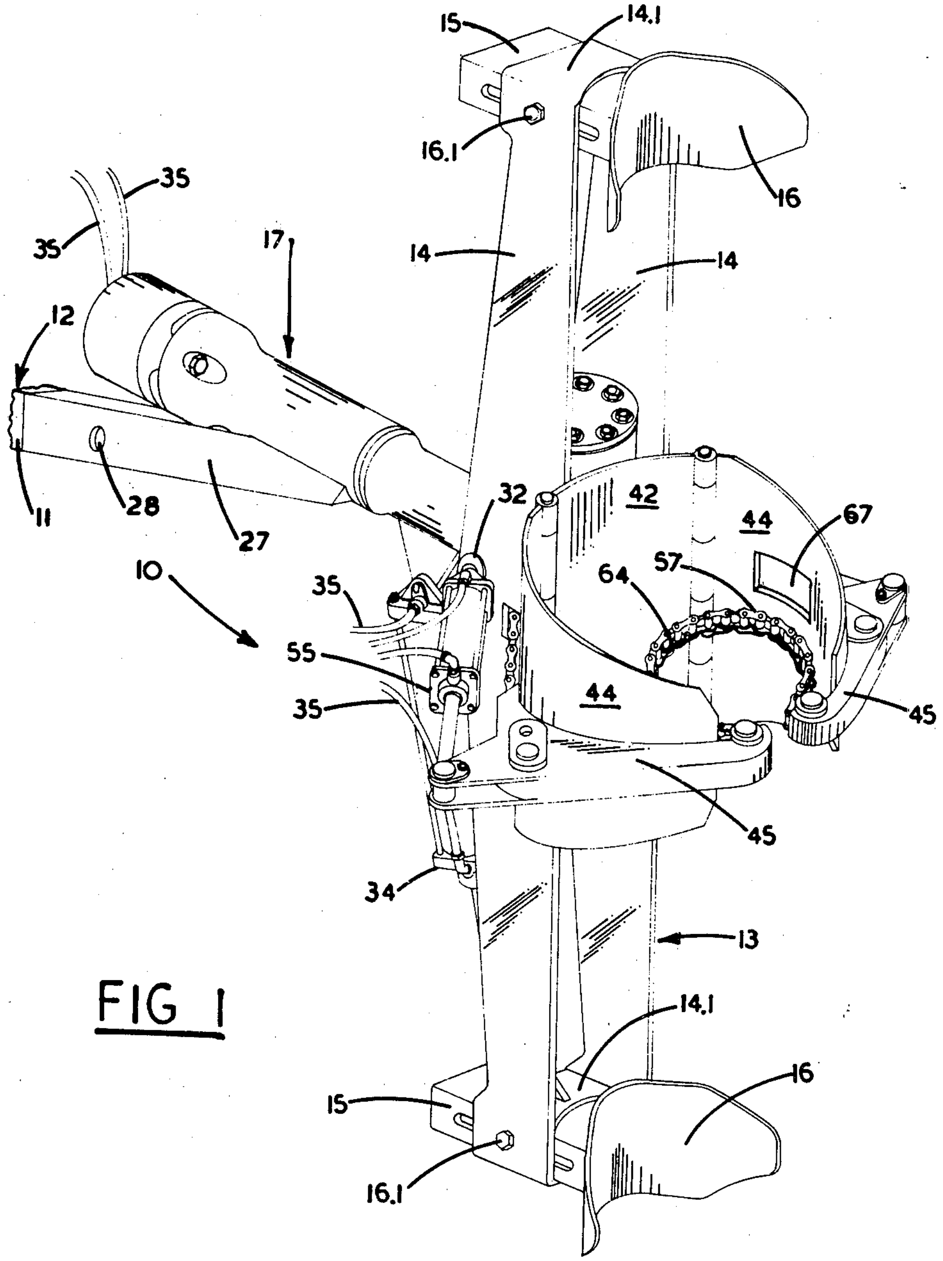
FIG. 1 is a perspective view of one embodiment of the grapple of the invention secured at the end of a boom of a hoisting machine.
Figure 2:
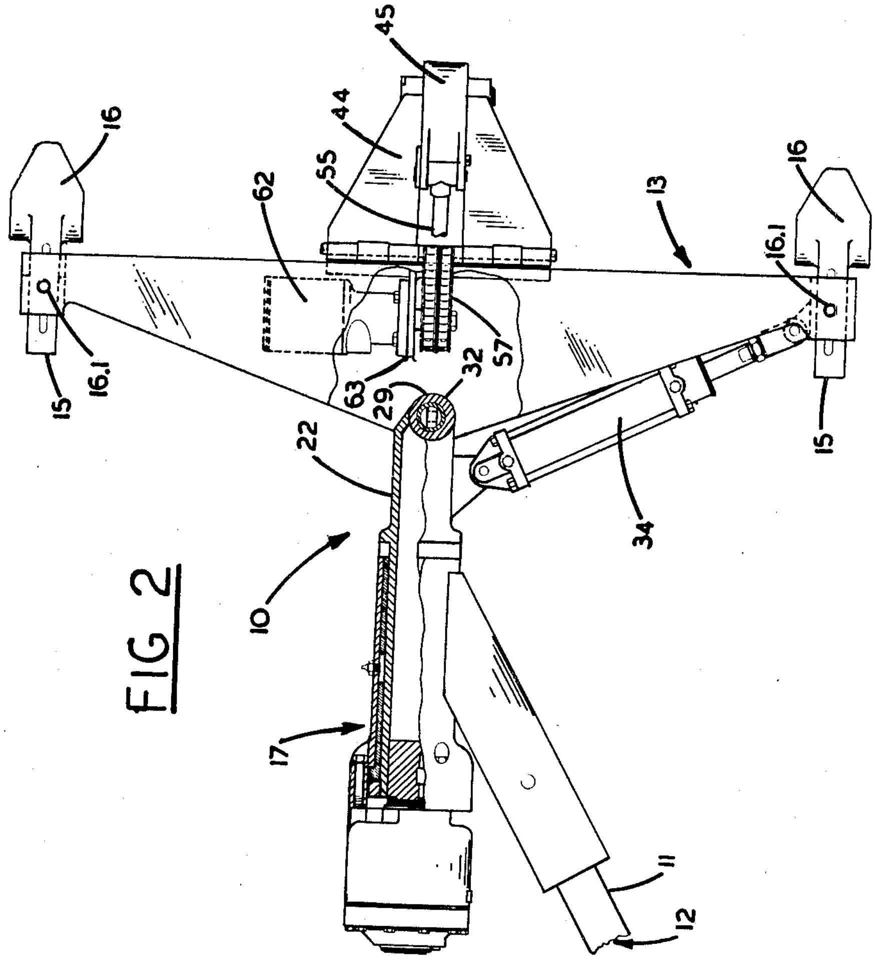
FIG. 2 is an elevational view with portions broken away of the embodiment shown in FIG. 1.

Referring to the drawings, in particular to FIGS. 1, 2, 3 and 4 thereof, there is shown one embodiment 10 of the grapple of the inventions secured at a free end 11 of an articulated boom 12 of a hoisting machine (not shown). The hoisting machine, conventionally, can be a self-propelled type adapted to have various hydraulically operated materials handling attachments connectable to its boom.

The grapple 10 has a supporting frame 13 which is formed of a pair of elongated side-by-side supports 14—14 adjacent ends of which are connected by spaced sets of brace plates 14.1, each set of which slidably receives stocks 15 of semi-circular stabilizing saddles 16. Bolts 16.1 extending through the supports 14 and stocks 15 provide means for securing stabilizing saddles in selected fore and aft adjusted positions.

Figure 5:
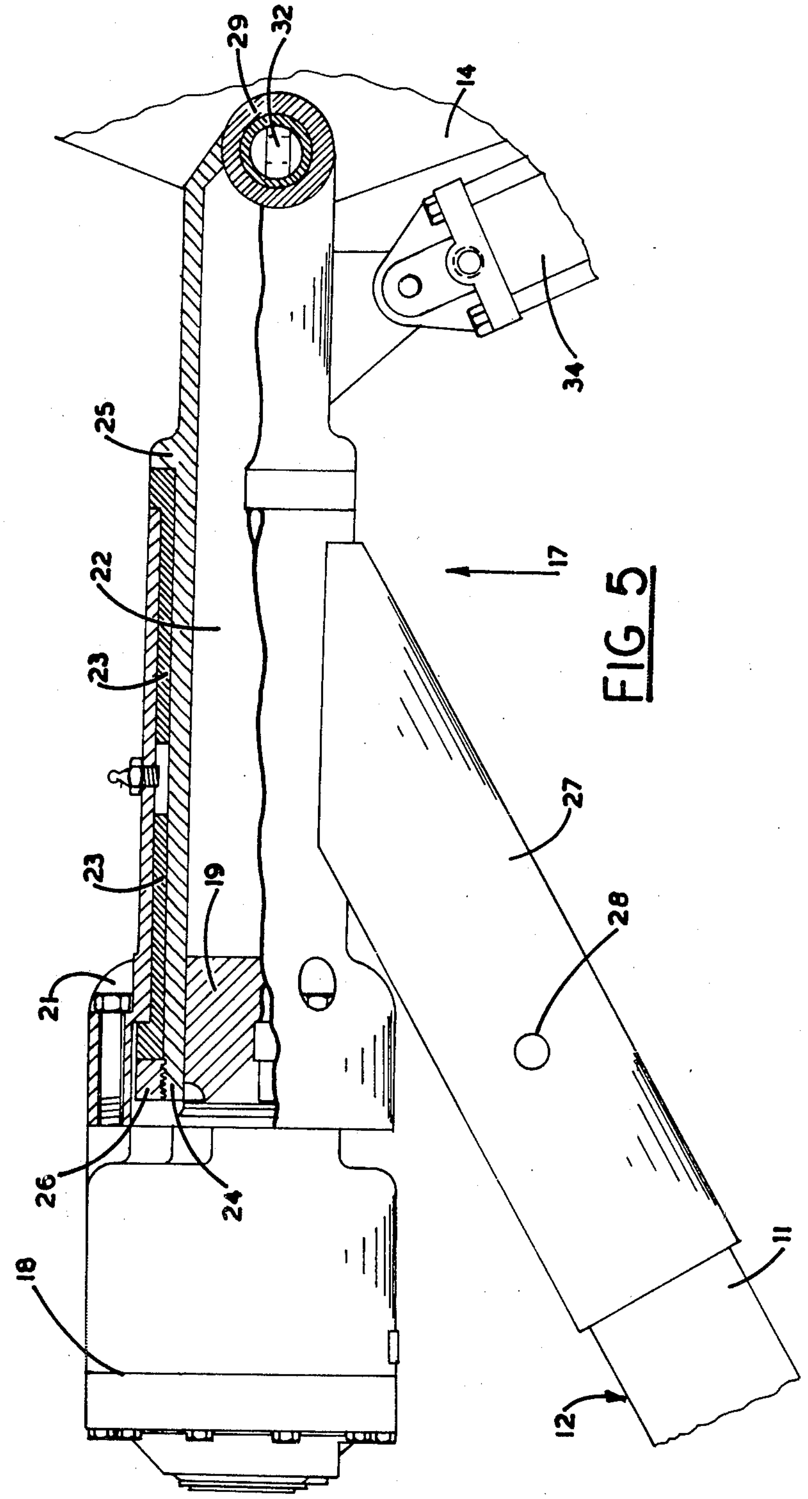
FIG. 5 is an enlarged side view of a connecting assembly with portions broken away.

The supporting frame is connected to the end of the boom for fore and aft pivotal movement and side-to-side rotative movement by means of a hydraulically operated connecting assembly 17 as illustrated in FIG. 5. The connecting assembly has a hydraulically-operated rotary actuator 18 having a drive shaft 19 to which one end of a tubular housing 21 is bolted. A supporting shaft 22 is rotatably supported in the housing in bushings 23—23 and is welded at one end 24 to the drive shaft 19. As shown, the supporting shaft is stepped at 25 to bear against one of the bushings to prevent inward movement of the supporting shaft of the housing and has a keeper 26 threaded on its end 24 which bears against the other bushing to prevent outward longitudinal movement. A tubular connecting piece 27 which is welded to the housing is adapted to receive the free end 11 of the boom, holes 28 being provided to enable a non-rotative connection of the boom and the connecting piece by means of bolts, not shown. The other end 29 of the supporting shaft is mounted on a pin 32 which extends between the two supports 14—14.

A piston cylinder assembly 34 extends between the supporting shaft 22 and the supporting frame for controlling pivotal movement of the supporting frame on the pin 32. Operating fluid to both the rotary actuator and the piston cylinder assembly 34 is supplied by flexible conduits, severally 35, through suitable controls, operated by the hoisting machine operator.

Figure 3:
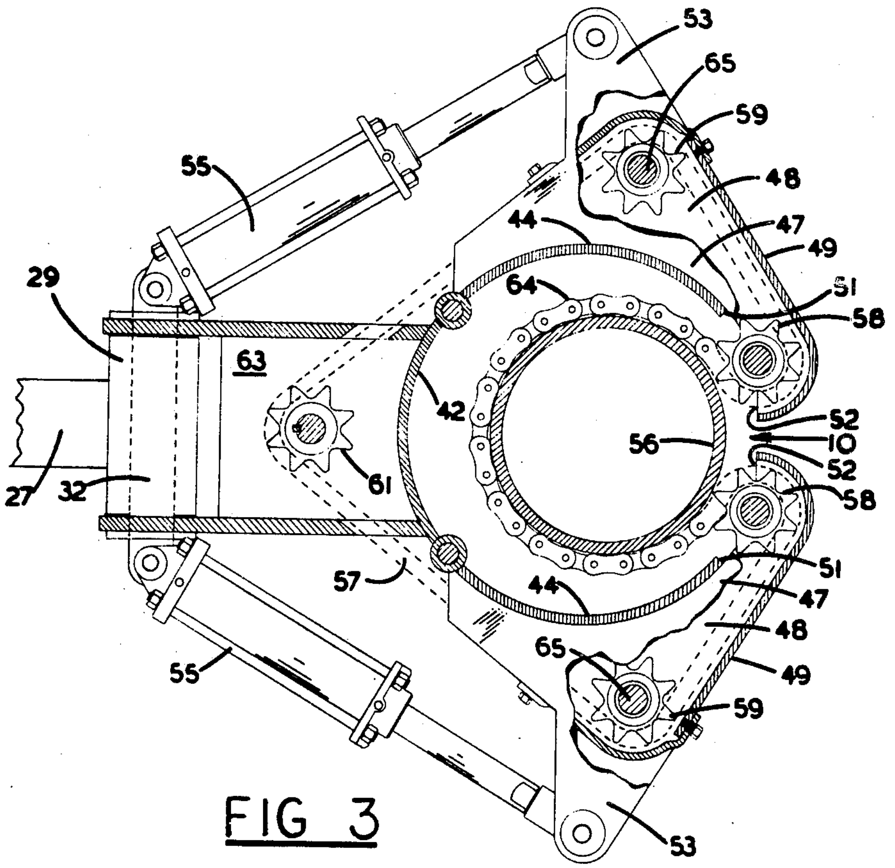
FIG. 3 is a plan view of the grapple shown in a closed position with portions broken away.
Figure 4:
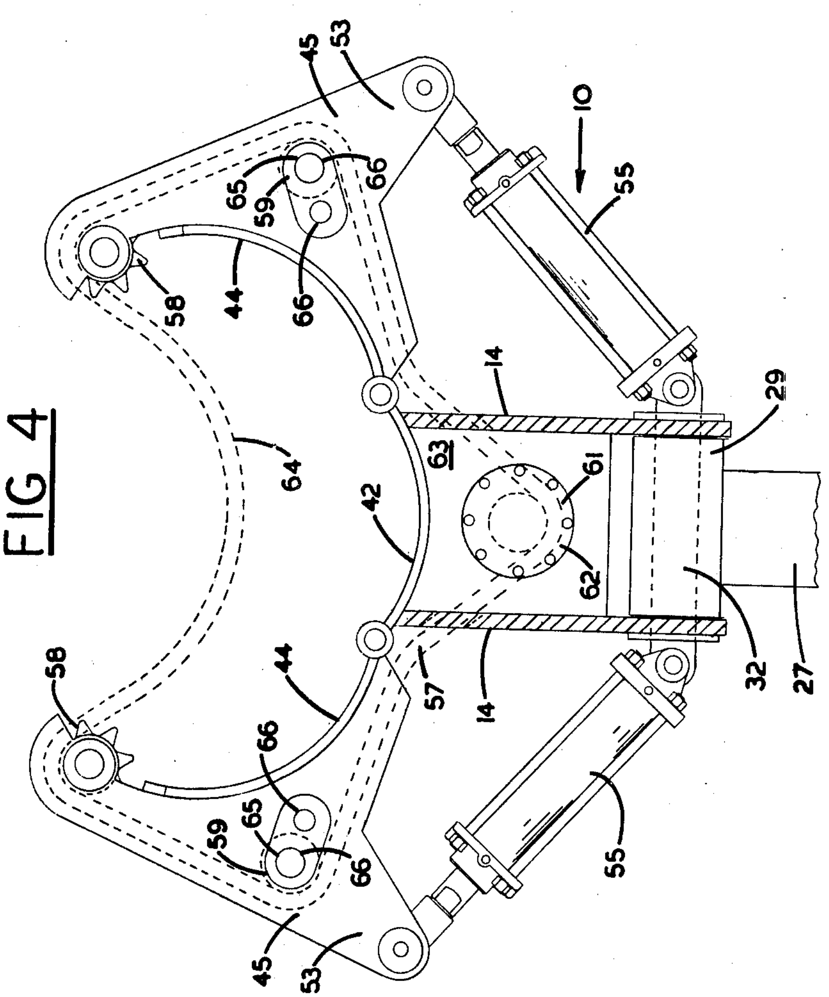
FIG. 4 is a plan view of the grapple shown in open position.

A central arcuate brace plate 42 extends between the supports 14—14 adjacent their midpoint and a pair of arcuate arms 44—44 are hingedly connected to the brace plate at opposite ends thereof for swinging movement. Chain housings 45—45 extend along the outer surface of each of the arms 44—44. Each chain housing (see FIG. 3) has spaced-apart parallel upper and lower plates 47 and 48 and an outer peripheral wall 49 and extends outwards beyond the tip 51 of each of the arms 44 providing openings 52 between the arms and the peripheral walls of the chain housings. The housings have extending lever portions 53—53 to which hydraulic piston and cylinder assemblies 55—55, which extend from the pin 32, are connected. The piston and cylinder assemblies 55—55, like the assembly 19, are controlled and operated in a conventional manner by the machine operator so that the arms can be moved simultaneously between a closed position as shown in FIG. 3 and an open position as shown in FIG. 4. Length and radius of curvature of the arms 44 and the plate 42 is such that with the arms in a closed position, as shown in FIG. 3, closed about a pole 56, they form substantially a partial cylinder, the diameter of which is considerably larger than the diameter of the largest pole to be handled.

An endless roller chain 57, see particularly FIG. 3, passes over idler sprockets 58—58 mounted between the upper and lower plates of the housings 45—45 at the openings 52 therein thence over idler sprockets 59—59 mounted between the said plates adjacent the lever portions 53 and thence behind the arms 44—44 and over a drive sprocket 61 which is driven by a reversible hydraulic motor 62 mounted on a bracket 63 between the supports 14—14. The supply of hydraulic fluid through suitable flexible conduits (not shown) to the motor 62 is controlled in a conventional manner by the machine operator. The roller chain, shown in broken outline in FIGS. 3 and 4, provides a pole engaging run 64 extending between the housings 45. Adjustment of length of pole engaging run for poles of varied diameter is provided by positional adjustment of the idler sprockets 59—59 which are mounted on axles 65 which can be selectively positioned in either one of two pairs of holes, severally 66, in the housings 45, access to the idler sprockets 59 being provided by way of openings 67, as shown in FIG. 1, in the arms 44.

In operation the machine operator, by suitably controlling disposition of the boom of the hoisting machine, and by suitably controlling, through the connecting assembly 17 and the piston and cylinder assembly 34, can locate the grapple in a horizontal position over a pole or the like lying on the ground and then close the arms 44 about the pole so that the pole-engaging run of the chain wraps around and embraces the pole, as shown in FIG. 3. The stabilizing saddles can then be adjusted so that each engages the pole. The pole can then be lifted to and arranged in a vertical or selected inclined position and then lowered into a prepared hole or onto a base onto which the pole is to be positioned and then, by suitably controlling operation of the hydraulic motor 62 oriented in azimuth by rotating about its own axis to align fittings or the like and then held in position until it is set by tamping, if it is to be set in a hole, or bolted in place.

It is seen that with adjustability provided by the adjustable sprockets 59—59 and by a chain provided with removable links, poles of various diameters can be accommodated.

Figure 6:
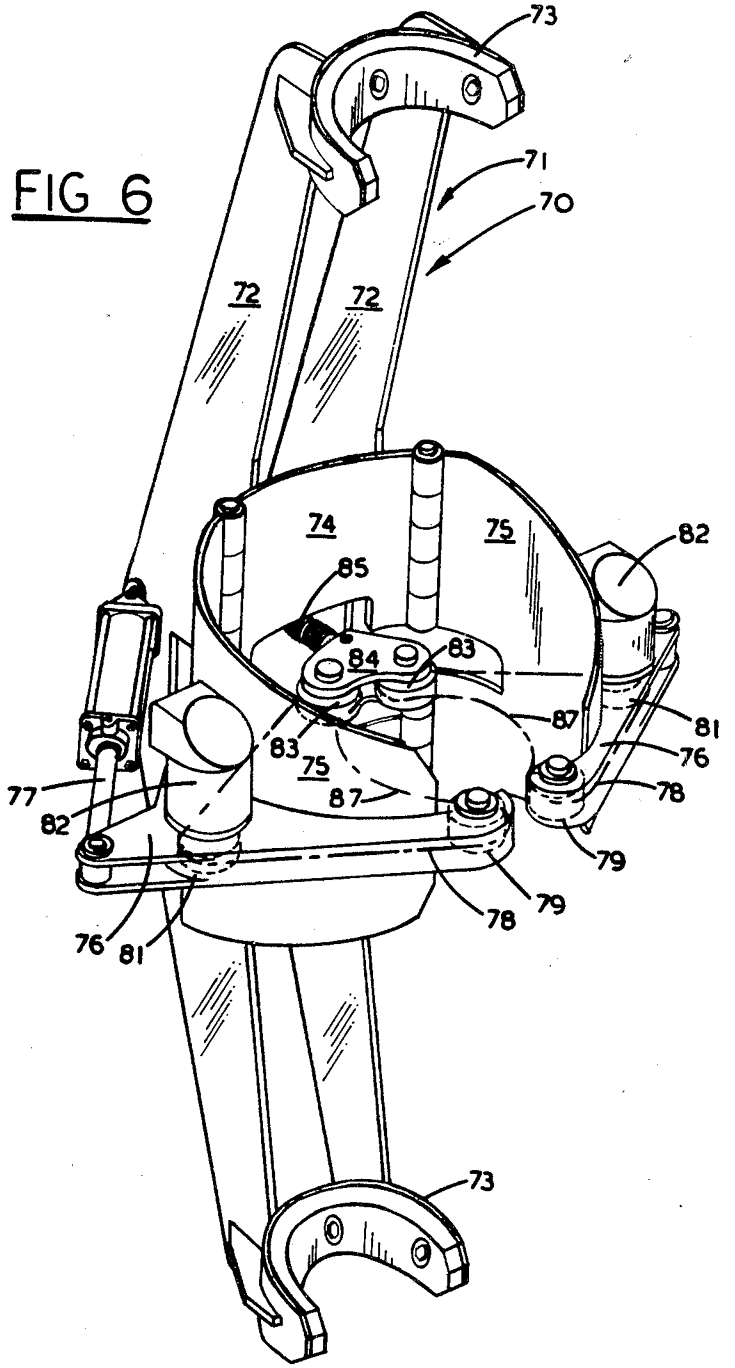
FIG. 6 is a perspective view of another embodiment of the grapple.

FIG. 6 shows another embodiment 70 of the grapple of the invention. The grapple 70 has a supporting frame 71 formed of a pair of elongated spaced parallel supports 72—72 which are the same as the supports 14, at ends of which are mounted supporting saddles 73—73. The supporting saddles 73 are shaped the same as the saddles 16, but unlike the saddles 16 are non-adjustably secured. The frame 71 is also adapted to be mounted on a movable hoisting machine (not shown) in the same manner as described with respect to grapple 10. Consequently, a connecting assembly similar to the connecting assembly 17 and a piston and cylinder assembly similar to piston and cylinder assembly 34 are not shown.

The grapple 70 also has an arcuate brace plate 74 to which are hingedly connected a pair of arms 75—75 and outer housings 76—76, all is described with reference to grapple 10, the arms being movable between open and closed positions by piston and cylinder assemblies 77—77 which correspond to the piston and cylinder assemblies 55 of the grapple 10.

The grapple 70 differs from grapple 10 in that it has a pair of endless roller chains 78—78, paths only being shown by broken line, the chains passing over idler sprockets 79—79 which correspond to idler sprockets 58—58 of grapple 10, and over sprockets 81—81 which correspond to sprockets 59—59. The sprockets 81—81 are, however, driven by reversible hydraulic motors 82—82 which are mounted on the housings 76—76, driving fluid to which is supplied by flexible conduits (not shown) and controlled by the machine operator. The chains 78—78 also pass over idler sprockets 83—83 which are mounted in a single tree configuration on a plate 84 to which one end of a heavy tension spring 85 is secured, the other end of the tension spring being connected in a conventional manner to a bracket (not shown) which corresponds to bracket 63 of grapple 10. The chains 78—78, provide complementary pole engaging runs 87—87 which move into gripping engagement with a pole when the arms are closed there-about.

In the foregoing specification and in the claims appended reference has been made to the use of roller chains for gripping the pole. It is to be understood, however, that the term endless chain shall encompass other endless flexible elements, for example, endless belts or suitable ropes. Consequently, the claims are to be read accordingly.

I claim:

1. A grapple for attachment to a boom of a hoisting machine for handling poles comprising:

an elongated supporting frame, support saddles mounted adjacent each of said support frame, means for pivotally attaching said supporting frame to a boom at approximately the mid-point of said supporting frame and means associated with said attaching means for rotating said supporting frame between substantially vertical and substantially horizontal positions, an arcuate brace plate fixedly attached to said supporting frame at approximately the mid-point thereof, a pair of arcuate arms each being hingedly connected at one end thereof to said brace plate, said arms each having a first sprocket journalled at the distal end thereof and a second sprocket journalled at approximately the mid-point of the arc of said arms and outside of said arc, means for pivoting said arms between open and closed positions, sprocket means attached to said supporting frame and journalled therein, endless chain means passing around said first and second sprockets and said sprocket means and adapted to substantially encircle and grip a pole when said arms are pivoted to said closed position, means permitting adjustment of said support saddles toward and away from said supporting frame for engaging a pole above and below said arms, and means for reversibly driving said endless chain means around said first and second sprockets and said sprocket means for rotating a pole gripped thereby about its longitudinal axis.

2. A grapple as in claim 1 and wherein:

said sprocket means comprises a pair of third sprockets, said endless chain means comprises a pair of endless chain members each passing around one each of said first, second and third sprockets and having pole engaging runs between said first and third sprockets, and means for driving each of said endless chain members in the same direction.

3. A grapple as in claim 2 and wherein:

said third sprockets are each mounted on a common sprocket support plate and including spring means connecting said sprocket support plate to said supporting frame.

4. A grapple as in claim 1 and wherein:

said sprocket means comprises a third sprocket journalled to said supporting frame, and said endless chain means comprises an endless chain member passing around each of said first and second sprockets and said third sprocket and having a pole engaging run between said first sprockets.

* * * * *